Feb. 11, 1936.  J. A. STONE  2,030,413
REFRIGERATOR
Filed Dec. 14, 1932  3 Sheets-Sheet 3
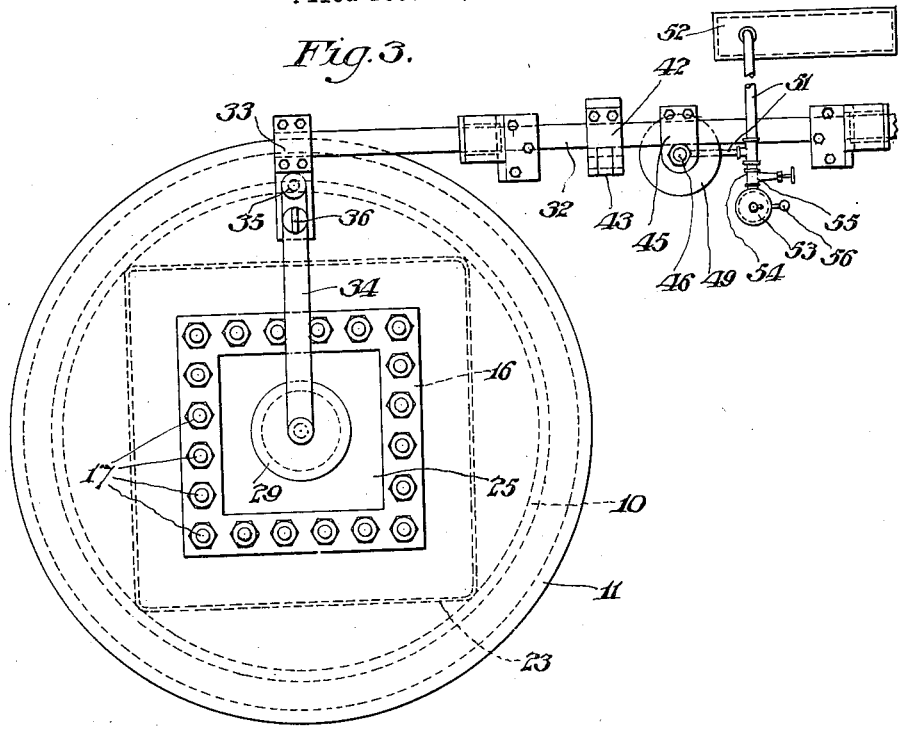
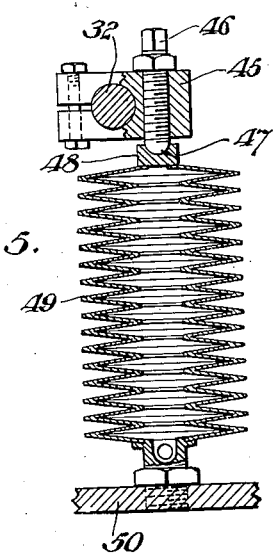
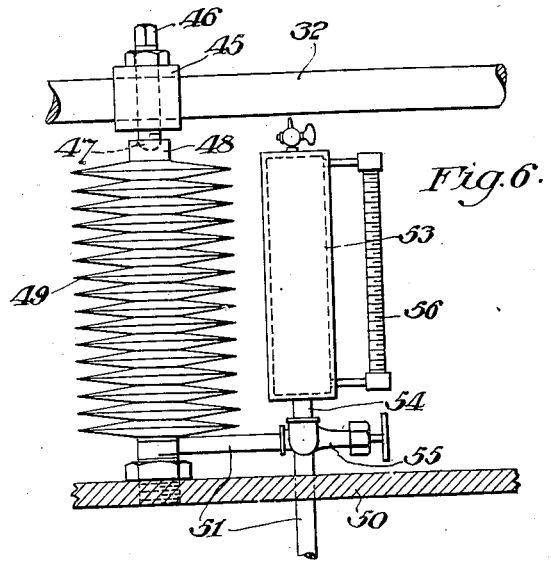
Inventor:
James A. Stone,
By Jas. C. Hobensmith
Attorney.

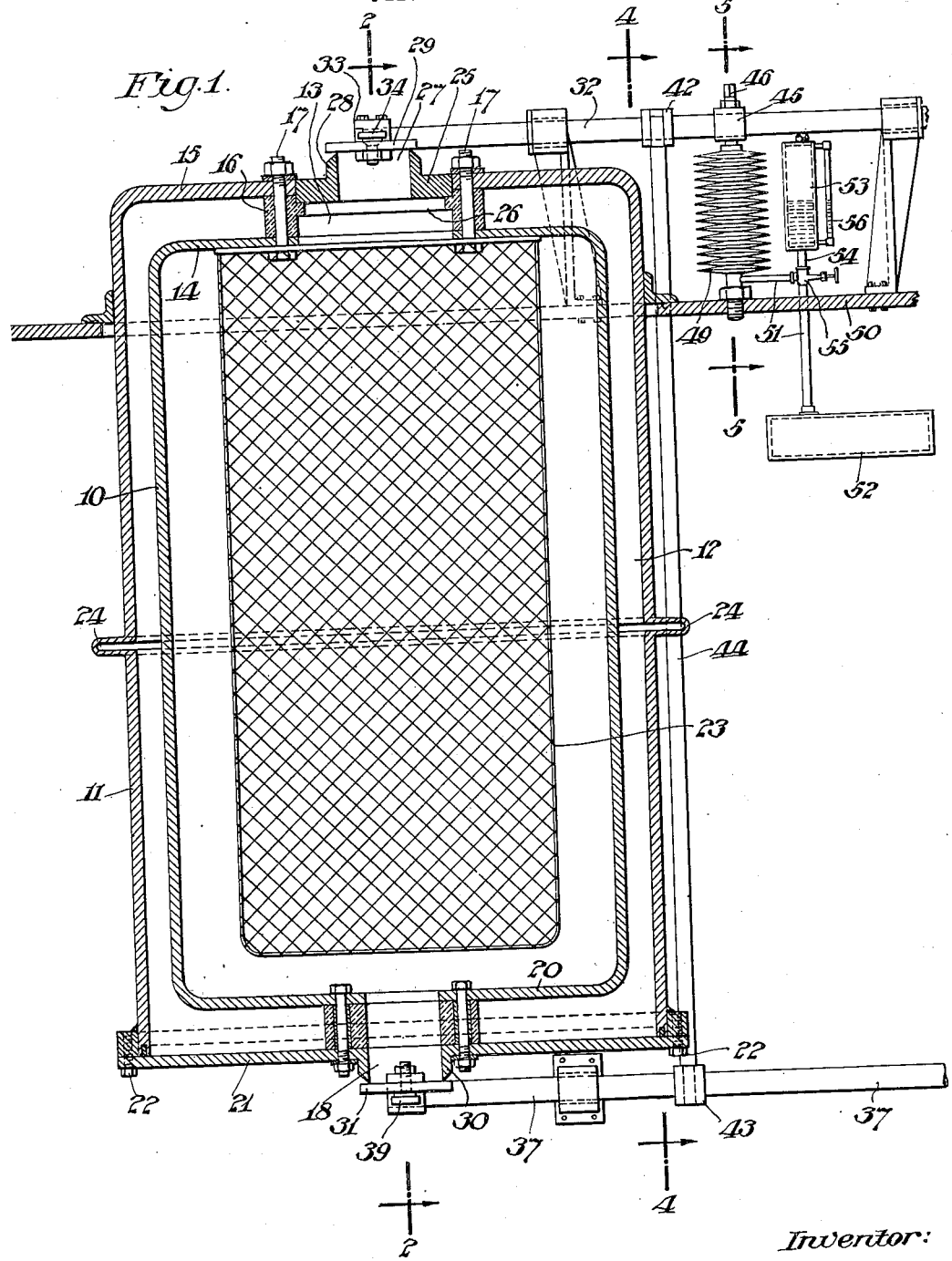

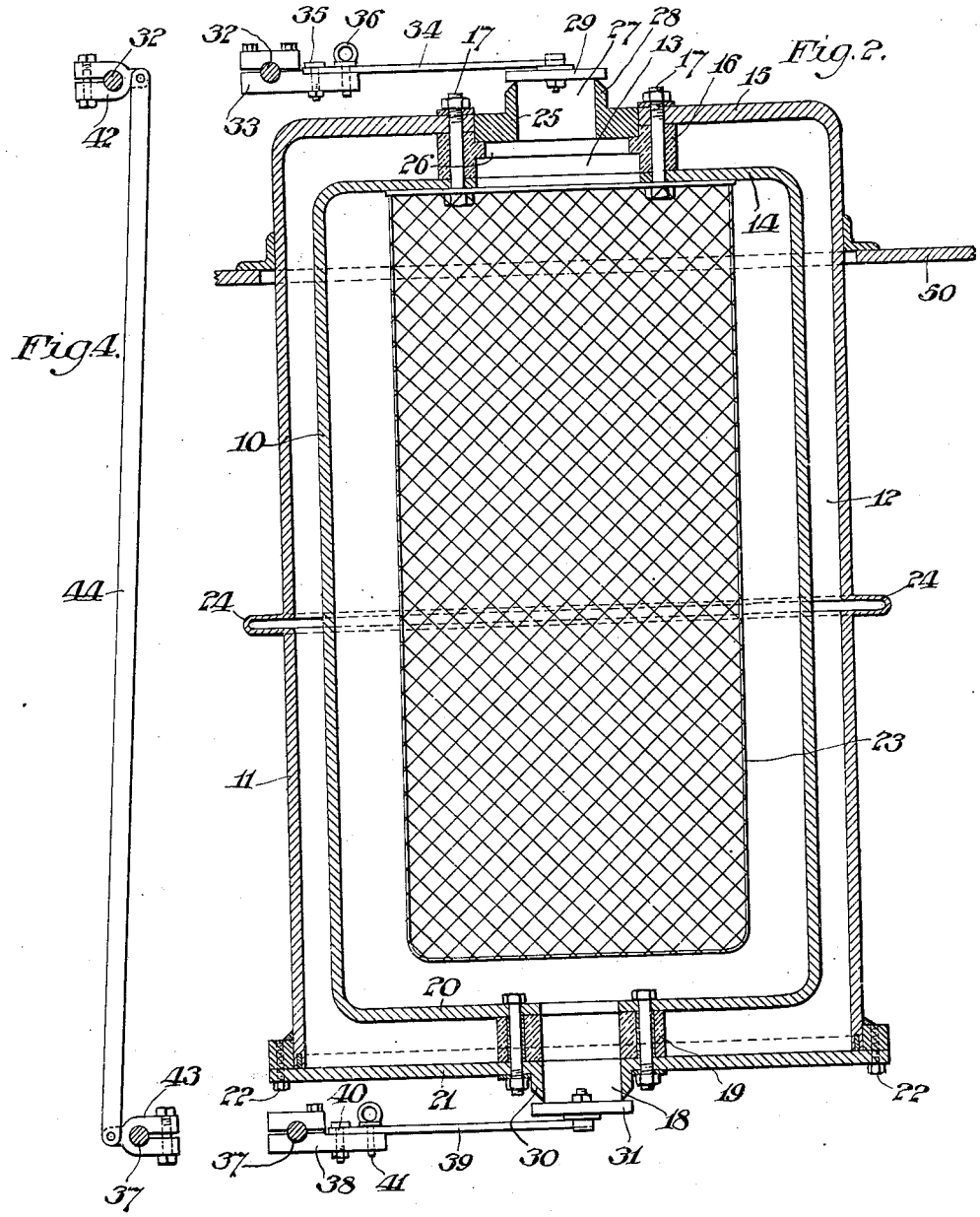

Patented Feb. 11, 1936

2,030,413

UNITED STATES PATENT OFFICE 2,030,413

REFRIGERATOR

James A. Stone, Philadelphia, Pa.

Application December 14, 1932, Serial No. 647,087

12 Claims. (Cl. 62—91.5)

My invention relates to refrigerators, and it has particular relation to apparatus which is adapted for the use of refrigerants of the type of solidified carbon dioxide, for maintaining the refrigerating chamber at the desired low temperature.

The principal object of my invention is to provide simple and efficient apparatus for economically using refrigerants such as solidified carbon dioxide, and with this object in view, my invention contemplates the provision of a novel form of container for the refrigerant, and novel means for controlling the flow of air and gases through said container, thus regulating the evaporation of the refrigerant, for the purpose of maintaining the desired low temperature in the refrigerating chamber.

My invention further contemplates the provision, as a component part of the device, of a novel form of temperature responsive device for actuating the controlling mechanism, which may be readily adjusted to be responsive to any deviation from the desired temperature.

The nature and characteristic features of my invention will be more readily understood from the following description, taken in connection with the accompanying drawings forming part hereof in which:

Figure 1 is a view partly in section and partly in elevation, illustrating refrigerating apparatus embodying the main features of my present invention;

Fig. 2 is a transverse section thereof, taken approximately on the line 2—2 of Fig. 1;

Fig. 3 is a top or plan view thereof;

Fig. 4 is a fragmentary detail view, illustrating a portion of the mechanism, this view being taken approximately on the line 4—4 of Fig. 1;

Fig. 5 is an enlarged view, partly in section and partly in elevation illustrating a portion of the temperature responsive device for controlling the flow of the gases through the refrigerant container, this view being taken approximately on the line 5—5 of Fig. 1; and Fig. 6 is a front elevation of the portion of the mechanism shown in Fig. 5.

It will, of course, be understood that the description and drawings herein contained are illustrative merely, and that various changes and modifications may be made in the structure disclosed without departing from the spirit of my invention.

Referring to the drawings, in the particular embodiment of my invention therein shown, there is provided a double walled container comprising an internal cylindrical shell 10, and a larger external shell 11, the difference in size between the inner and outer shells providing a space 12 for the purpose of minimizing the transfer of heat through the walls of the container.

A vacuum may be created in the space 12, or if desired said space may be filled with a suitable gas having low heat conductive properties; and for the purpose of minimizing still further the transfer of heat through the walls of the container, the outer surface of the internal shell 10 and the inner surface of the external shell 11 may be suitably coated in order to reduce the amount of heat radiation across said space 12.

An opening 13 is provided at the top of the container, and at the place where this opening is located the top wall 14 of the inner shell 10 is held in spaced relationship with respect to the top wall 15 of the outer shell 11 by means of a spacer member 16. Fastening bolts 17 extend through the walls of the container and through the spacer member.

The spacer member 16 is preferably made of bakelite or other suitable material having low heat conductivity, in order to reduce the transmission of heat at this point, and for the same purpose bakelite washers may be placed under the nuts of the fastening bolts 17.

A port 18 is provided at the bottom of the container, at which point a spacer ring 19, also preferably made of bakelite or other material of low heat conductivity, serves to separate the lower wall 20 of the internal shell 10 from the header plate 21 of the external shell 11. The header plate 21 at the lower end of the external shell 11 is preferably attached to the body portion of said external shell by means of bolts 22, this arrangement being provided to facilitate the assembly of the container parts.

A basket 23, which may be made of woven wire or other similar material, is suspended from the top wall of the container, the bottom of said basket being disposed above the bottom wall of the inner shell of the container. As the basket 23 is preferably made square in horizontal section, a circulating space is insured both at the sides and at the bottom of the body of the refrigerant contained within the basket, as hereinafter described.

The body portion of the external shell 11 is also preferably provided with an annular crease 24, to provide for differences in expansion and contraction between the inner and outer shells of the container structure.

The opening 13 at the top of the container is preferably made square, and larger than the port 18 at the bottom of said container. A stopper member 25 is seated in the square opening 13 at the top of the container, resting upon a ledge 26 extending from the inner sides of the spacer member 16. The stopper member 25 is also provided with a port 27, and an upwardly extending flange 28 surrounds said port 27 and forms a seat for a valve disk 29, which serves to control the admission to the interior of the container, of air and gases from the refrigerating chamber within which the apparatus is mounted.

Likewise, at the bottom of the container, the header plate 21 is provided with a downwardly extending flange 30 surrounding the port 18, which serves as a seat for a valve disk 31 which controls the egress of air and gases from the interior of the container to the refrigerating chamber in which the apparatus is mounted.

Arranged above the container, and at the rear thereof, is a transversely extending shaft 32, on which a bracket 33 is secured. The bracket 33 serves as a means for mounting a lever arm 34, at the end of which the valve disk 29 is carried. The preferred manner of securing the lever arm 34 to the bracket 33 carried by the shaft 32 consists of a bolt 35, by means of which the lever 34 is pivotally secured to the bracket member 33, and a removable pin 36, which extends through registered openings in the lever 34 and bracket member 33, respectively, the arrangement being such that when the pin 36 is removed, the lever 34 and the valve disk 29 carried thereby may be swung sidewise, for a purpose to be presently explained.

Likewise, at the bottom and to the rear of the container, there is provided another transversely extending shaft 37, to which a bracket member 38 is secured, which bracket member serves as a means of attachment for a lever arm 39, which is secured in a manner similar to that of securing the upper lever arm 34, by means of a bolt 40 and a removable pin 41. The lever arm 39 carries a valve disk 31, which is provided at the lower end of the container and is adapted to close the port 18.

The shaft 32 at the top also has a lever 42 secured thereto at any suitable place along its longitudinal extension, and likewise the shaft 37 at the bottom is provided with a similar lever 43. The levers 42 and 43 extend to the front and rear, respectively, and are joined by means of a connecting rod 44, the arrangement being such that when the upper shaft 32 is actuated in the manner to be hereinafter described, for the purpose of raising the valve disk 29 at the top from its seat, the lower shaft 37 will be simultaneously actuated to cause the valve disk 31 at the bottom to be moved from its seat.

Also, at any convenient location along the longitudinal extension of the top shaft 32, a lever 45 is secured to said shaft. A bolt 46 is adjustably mounted in the end of the lever 45. The bolt 46 projects downwardly from the lever 45, and is provided with a rounded lower end 47, seated in a disk 48 carried at the upper end of a bellows 49, which may be of the metallic sylphon type. The lower end of the bellows 49 may be secured to a fixed plate 50, which may also serve to support the refrigerant container.

The interior of the bellows 49 is connected by suitable piping 51 to a closed hollow receptacle 52, which is located at any desired position within the refrigerating chamber the temperature of which is to be controlled. The receptacle 52 and the bellows 49, as well as the piping 51 forming the communication therebetween, are filled with a suitable liquid, the expansion and contraction of which, by changes in temperature, serve to lengthen and shorten the bellows 49, for a purpose to be presently explained.

For the purpose of adjusting the foregoing device, so that the same will be responsive at the desired temperature, there is provided a reservoir 53, connected at its bottom portion to a branch pipe line 54, which is connected to the piping 51 which extends from the bellows 49 to the receptacle 52. A valve 55 is interposed in the pipe line 54, and the reservoir 53 is provided with a gauge glass 56, which may be suitably graduated to indicate the quantity of liquid in the reservoir 53 (see Fig. 6), and consequently the temperature for which the apparatus is set.

The operation of the device may now be explained. A suitable quantity of the refrigerant, such as solidified carbon dioxide, being placed in the basket 23, within the container, the evaporation thereof will normally be retarded by the insulating qualities of the double wall of the container, but whenever the temperature of the refrigerating chamber within which the apparatus is mounted rises above the proper degree, this will cause the liquid within the receptacle 52 to expand, which in turn will cause bellows 49 to become elongated, whereupon the lever 45 which carries the bolt 46 will be actuated, thus rotating the shaft 32 slightly about its axis.

As the shaft 32 is thus rotated, the free end of the lever arm 34 which is carried by the bracket 33 will be raised, and consequently the valve disk 29 carried at the end of said lever 34 will be raised from its seat.

Simultaneously with the raising of the valve disk 29 from its seat, the lower shaft 37 will also be actuated by means of the lever 42, connecting rod 44, and lever 43, whereupon the valve disk 31 carried at the end of the lever arm 39 will be lowered from its seat.

In this manner, the air and such commingled gases as may be within the regrigerating chamber will be permitted to flow through the interior of the container. This will cause a quantity of the refrigerant to be evaporated, whereupon the circulating air and gases and the gases thrown off by the evaporation of the refrigerant will be mixed, and will flow through the bottom port 18 into the refrigerating chamber, causing a drop in temperature of the required amount.

When a sufficient drop in temperature occurs, the liquid contained within the receptacle 52 will be contracted, thus shortening the extension of the bellows 49 and causing the valve disks 29 and 31 to return to their respective seats.

Whenever it is desired to replenish the supply of refrigerant in the container, the pin 36 is removed, whereupon the lever 34, and the valve disk 29 carried thereby, may be swung about the bolt 35 by which the lever 34 is secured to the bracket member 33. The stopper device 25, which is mounted in the opening 13 in the upper end of the container, may then be removed, and through the enlarged opening thus provided additional blocks of the refrigerant may be placed in the basket 23 in the interior of the container.

When it is desired to adjust the temperature responsive device, the valve 55 is opened, permitting liquid to flow from the reservoir 53 to the interior of the below 49, or vice versa as required, the proper degree of adjustment being indicated by the graduations on the gauge glass 56 mounted on the side of the reservoir 53. After the proper adjustment is made, the valve 55 is closed, and remains closed during the normal operation of the apparatus.

I claim:

1. Refrigerating apparatus comprising a heat insulated container adapted to receive a quantity of evaporative refrigerant, said container having inlet and outlet ports to permit the flow of air and gases through said container; means for controlling the flow through said ports comprising valve members adapted to close the same; means for actuating said valve members to their open and closed positions, said means comprising a pair of levers at the ends of which said valve members are mounted, shafts to which said levers are connected, means for causing said shafts to be simultaneously actuated comprising levers mounted thereon and extending in opposite directions and a connecting rod connecting the ends of said levers; and a temperature responsive device adapted to actuate said shafts.

2. In combination, a temperature responsive device including a closed receptacle containing a liquid responsive to temperature changes; and means for adjusting said temperature responsive device comprising a reservoir containing a quantity of the temperature responsive liquid, piping forming a communication between said reservoir and the interior of said receptacle, and a normally closed valve interposed in said piping.

3. In combination, a temperature responsive device including a closed receptacle containing a liquid responsive to temperature changes; means for adjusting said temperature responsive device comprising a reservoir containing a quantity of the temperature responsive liquid, piping forming a communication between said reservoir and the interior of said receptacle, a normally closed valve interposed in said pipe line, and means for indicating the quantity of liquid in said reservoir.

4. A temperature responsive device comprising a bellows, a closed receptacle containing a liquid responsive to temperature changes, piping forming a communication between the interior of said receptacle and the interior of the bellows; and means for adjusting said temperature responsive device comprising a reservoir containing a quantity of the temperature responsive liquid, piping forming a communication between said reservoir and the interior of said receptacle, a normally closed valve interposed in said piping, and means for indicating the quantity of liquid in said reservoir.

5. In refrigerating apparatus, a heat insulated container for an evaporative refrigerant comprising an inner and an outer shell separated to provide a space therebetween; members made of a material of low heat conductivity provided at the top and bottom respectively of said container and serving to hold the inner and outer shells in spaced relationship, the member at the bottom having a port extending therethrough, and the member at the top having an opening larger than said port; and a removable member mounted in said opening, said removable member having a port extending therethrough.

6. In refrigerating apparatus, a heat insulated container for an evaporative refrigerant comprising an inner and an outer shell separated to provide a space therebetween; members made of a material of low heat conductivity provided at the top and bottom respectively of said container and serving to hold the inner and outer shells in spaced relationship, the member at the bottom having a port extending therethrough, and the member at the top having an opening larger than said port; a removable member mounted in said opening and having a port extending therethrough; and valve members adapted to close said ports.

7. Refrigerating apparatus comprising a heat insulated container adapted to receive a quantity of an evaporative refrigerant, said container having an outlet port at the bottom; a removable member mounted in an opening at the top of the container through which opening the refrigerant may be placed within the container, said removable member having a port extending therethrough; valve members adapted to close said ports; levers upon which said valve members are mounted; and a pivotal support for the lever which carries the valve for closing the top port, said pivotal support permitting said valve and lever to be swung to one side to clear the opening.

8. Refrigerating apparatus comprising a heat insulated container adapted to receive a quantity of evaporative refrigerant, said container having an inlet port in the upper portion thereof and an outlet port in the lower portion thereof to permit the flow of air and gases through said container; means for controlling the flow through said ports comprising a valve member for each port adapted to close the same; means for actuating said valve members to their open and closed positions comprising a pair of valve operating levers at the ends of which said valve members are mounted, longitudinally extending shafts to which said levers are connected, means for simultaneously actuating said shafts including levers adjustably mounted thereon and extending in opposite directions, and a connecting rod connecting the ends of said levers; and a temperature responsive device adapted to actuate said shafts.

9. Refrigerating apparatus comprising a heat insulated container adapted to receive a quantity of evaporative refrigerant, said container having an inlet port in the upper portion thereof and an outlet port in the lower portion thereof to permit the flow of air and gases through said container; means for controlling the flow through said ports comprising a valve member for each port adapted to close the same; means for actuating said valve members to their open and closed positions comprising a pair of valve operating levers at the ends of which said valve members are mounted, longitudinally extending shafts to which said levers are connected, and means for simultaneously actuating said shafts including levers adjustably mounted thereon and extending in opposite directions, and a connecting rod connecting the ends of said levers.

10. Refrigerating apparatus comprising a heat insulated container adapted to receive a quantity of evaporative refrigerant, said container having an inlet port in the upper portion thereof and an outlet port in the lower portion thereof to permit the flow of air and gases through said container; means for controlling the flow through said ports comprising a valve member for each port adapted to close the same; means for actuating said valve members to their open and closed positions comprising a pair of valve operating levers at the ends of which said valve members are mounted, longitudinally extending shafts to which said levers are connected, and means for simultaneously actuating said shafts including a temperature responsive device.

11. Refrigerating apparatus comprising a heat insulated container adapted to receive a quantity of evaporative refrigerant, said container having inlet and outlet ports to permit the flow of air and gases through said container, and means for controlling the flow through said ports including a valve member for each of said ports adapted to close the same, a shaft for each of said valves, each of said shafts extending longitudinally of and beyond said container, and means for simultaneously actuating said shafts.

12. Refrigerating apparatus comprising a heat insulated container adapted to receive a quantity of evaporative refrigerant, said container having inlet and outlet ports to permit the flow of air and gases through said container, and means for controlling the flow through said ports including a valve member for said inlet port and a valve member for said outlet port, said valve members being adapted to close said ports, a shaft extending longitudinally of and beyond said container and operatively connected to said inlet valve member for actuating the same, and another shaft extending longitudinally of and beyond said container and operatively conneected to said outlet valve member for actuating the same, and means for simultaneously actuating said shafts.

JAMES A. STONE.